United States Patent [19]

Senuma et al.

[11] 4,424,181

[45] Jan. 3, 1984

[54] PROCESS AND COMPOSITION FOR PRODUCING OPEN-CELL CROSS LINKED POLYOLEFIN FOAM

[75] Inventors: Akitaka Senuma; Takao Aizawa, both of Yokohama, Japan

[73] Assignee: Nippon Unicar Company, Tokyo, Japan

[21] Appl. No.: 433,869

[22] Filed: Oct. 13, 1982

[51] Int. Cl.³ .............................................. B29H 7/20
[52] U.S. Cl. .............................. 264/54; 264/DIG. 18; 521/91; 521/96; 521/139; 521/140
[58] Field of Search ................... 521/139, 140, 91, 96; 264/54

[56] References Cited

U.S. PATENT DOCUMENTS

| | | | |
|---|---|---|---|
| 3,067,147 | 12/1962 | Rubens et al. | 264/50 |
| 3,542,702 | 1/1970 | Okada et al. | 521/140 |
| 3,714,083 | 1/1973 | Nakayama et al. | 521/140 |
| 3,717,559 | 2/1973 | Nojiri et al. | 521/140 |
| 4,049,757 | 9/1977 | Kammel | 264/22 |
| 4,097,319 | 6/1978 | Shimokawa et al. | 264/22 |
| 4,203,815 | 5/1980 | Noda et al. | 521/140 |

FOREIGN PATENT DOCUMENTS 1126857 9/1968 United Kingdom ............... 521/140

Primary Examiner—Morton Foelak
Attorney, Agent, or Firm—Clement J. Vicari

[57] ABSTRACT

A composition suitable for open-cell polyolefin foam which comprises 100 parts by weight of olefin resin, 1 to 20 parts by weight of blowing agent, 0.3 to 10 parts by weight of organic peroxide crosslinking agent, 0.1 to 10 parts by weight of trifunctional monomer, and 1 to 5 parts by weight of silicone oil or a derivative thereof.

1 Claim, No Drawings

PROCESS AND COMPOSITION FOR PRODUCING OPEN-CELL CROSS LINKED POLYOLEFIN FOAM

BACKGROUND OF THE INVENTION

1. Field of the Invention

The present invention relates to a composition suitable for producing open-cell polyolefin resin foam. In another aspect, the present invention relates to a process for the single step production of open-cell cross-linked polyolefin resin foam from such composition.

2. Description of the Prior Art

Foams of ethylene polymer are used in large quantities as heat insulating materials, packaging materials, and cushioning materials. They are mostly of the closed-cell type which are not suitable for applications where water absorptivity and breathability are required. Breathable, open-cell foams which are available in limited quantities are coarse in cell size, poor in hand, and are used for limited applications.

The most popular open-cell foams derived from rubber or polyurethane degrade easily when exposed to ultraviolet rays and ozone.

According to the known conventional process for the production of open-cell polyethylene foam, a closed-cell foam is first prepared and subsequently the cells are broken by expansion with heating. This process gives rise to a foam which lacks resiliency and causes "bottom-out". In addition, uniform cell opening is difficult to achieve and the resulting cells are coarse in size. To remedy this drawback, a process was developed by which closed cells are opened by pressing. Unfortunately, the process disadvantages are that two steps are required, the resulting foam is thin, and the broken cell walls remain unremoved, making the foam poor in water absorption and breathability.

To overcome these shortcomings, there was proposed an improved process in Japanese Pat. No. 47-31695, which comprises the steps of cooling a closed-cell foam to a temperature under or in the neighborhood of the glass transition point and subsequently compressing the foam to rupture its cell membranes. This process needs expensive equipment and coolant such as liquified nitrogen is required.

Japanese Pat. No. 55-42100 discloses another process for preparing an open-cell polyethylene foam in one step by pressing and heating a mixture of polyethylene, blowing agent, crosslinking agent, and a large quantity of amorphous polypropylene. According to this disclosure, the amorphous polypropylene should preferably be incorporated in an amount from 30 to 50 wt. %, and that when the quantity is less than 20 wt. %, the ratio of open cells decrease. The use of amorphous polypropylene is of industrial significance because it is a by-product in the production of crystalline polypropylene and was previously discarded as a material of no commercial value. Amorphous polypropylene is a viscous clay-like material at room temperature which is difficult to mold when used alone. It has been used as a bulking filler added in small quantities to low-priced foams. In such use, the incorporation of large quantities as mentioned above will adversely affect the mechanical properties and hand of the resulting foams.

The disclosure of Japanese Pat. Laid-Open No. 54-63172 is characterized in that 100 parts by weight of polyolefin resin is compounded with 30 to 300 parts by weight of inorganic powder and the composition is allowed to expand to make closed-cell foam, and subsequently the closed cells are ruptured by deformation. This patent discloses that the foam is made to open more easily if the inorganic filler undergoes surface treatment which decreases the bond strength between the inorganic material and polymer. This means that it is necessary to incorporate a large amount of inorganic substance in order to accomplish the rupture of the foam cells. It can be easily conjectured that the presence of an inorganic substance will make the foam different from the original polyethylene foam in mechanical properties and hand feel. This indicates how difficult it is to make open-cell foams from a polyolefin.

After extensive studies to solve the above-mentioned problems involved in the prior art technology, we developed a process for producing open-cell foam of polyolefin which is superior in compressive property, water absorption, weatherability, and hand and which keeps the characteristics of polyolefin even when a large quantity of additive is incorporated, by a simple process without additional process for cell rupture. The elements which constitute the technology of the present invention are summarized as follows:

First, the relationship between the decomposition temperature of the blowing agent and the decomposition temperature of the crosslinking agent is inverted from that in the conventional technology. Secondly, the cells before and after rupture are made fine and uniform in size by adding a small quantity of a trifunctional compound and silicone oil or a derivative thereof. Thirdly, the foam can be produced batchwise in a furnace as well as continuously. Finally, the composition before foaming can be in the form of pellets, powder, film, sheet, and other shapes of moldings.

It is, therefore, an object of this invention, therefore, to provide an open-cell foam which is outstanding in breathability, water absorption, weather resistance, flexibility, and hand which are attributable to the open-cell structure.

It is another object of the invention to provide a process which permits the production of open-cell foam by a single heating step, without the need for a crushing step to open cells.

SUMMARY OF THE INVENTION

Broadly contemplated the present invention provides a composition suitable for open-cell polyolefin foam which comprises 100 parts by weight of olefin resin, 1 to 20 parts by weight of blowing agent, 0.3 to 10 parts by weight of organic peroxide crosslinking agent, 0.1 to 10 parts by weight of trifunctional monomer, and 1 to 5 parts by weight of silicone oil or a derivative thereof, said organic peroxide have a 10-minute half-value temperature $(T_p)$ of 110° C. to 170° C. and said blowing agent have a decomposition temperature $(T_f)$ of 100° C. to 160° C., $T_p$ and $T_f$ satisfying the following equation;

$$-10° C. \leq T_p - T_f \leq 50° C.$$

In another aspect there is provided a process for producing open-cell cross linked polyolefin foam which comprises forming a composition comprising 100 parts by weight of olefin resin, 1 to 20 parts by weight of blowing agent, 0.3 to 10 parts by weight of organic peroxide crosslinking agent, 0.1 to 10 parts by weight of trifunctional monomer, and 1 to 5 parts by weight of silicone oil or a derivative thereof, said organic peroxide having a 10-minute half-value temperature ($T_p$) of 110° C. to 170° C. and said blowing agent having a decomposition temperature ($T_f$) of 100° C. to 160° C., $T_p$ and $T_f$ satisfying the following equation;

$$-10° C. \leq T_p - T_f \leq 50° C.,$$

molding said composition into pellets, powder, film or sheets, and subsequently heating said moldings in a single step.

DETAILED DESCRIPTION OF THE INVENTION

The fact that the foaming composition of this invention may take any form means that open-cell foams can be produced from pellets, powder, film, or sheet and that the foams can be produced in a continuous inline process. For instance, a thus foamed sheet can be produced by forming the compound into a thin sheet and subsequently passing the film through a heating furnace. A thick foam sheet can be produced by passing pellets scattered in a single layer through a heating furnace. These processes are more productive than the conventional process in which a bulk foam is prepared first and then the bulk is sliced into thin foam sheets.

In the technology of this invention it is essential that the mixing to obtain the compound using an extruder or kneader should be performed at a temperature at which the crosslinking agent and blowing agent do not decompose substantially. According to the process of this invention, it is also possible to make open-cell foams by preparing at first a powder composition by incorporating powder or liquid additives to a polyolefin resin and then heating the composition.

The foam resulting from the process of this invention has a very fine and uniform cell structure. This is significant in view of the fact that the conventional foam has an irregular foam structure after cell rupture although it has uniform closed cells before cells are ruptured. In addition, in the conventional process employing one-step heat expansion the resulting foams contain coarse cells. It has been impossible to obtain by the conventional process an open-cell foam having fine cells as small as 0.2±0.03 mm in average cell diameter.

The principle which made possible the production of open and fine cells has not been elucidated completely. Presumably, this has resulted from the combination of (a) the addition of silicone oil or a derivative thereof (b) the increased crosslinking rate accomplished by trifunctional radicals, and (c) the unique reaction mechanism which is inverse to the conventional process with respect to the selection of blowing agent and crosslinking agent.

It is one of the characteristics of this invention to provide foams having superior weatherability which keeps the foam intact after outdoor exposure for six months.

Ethylene polymer as used in this invention means a polymer consisting mainly of ethylene, and includes ethylene-vinyl ester copolymers, ethylene-alkyl acrylate copolymers, ethylene-propylene copolymers, and ethylene-alpha-olefin copolymers.

The organic peroxide used in the process of this invention has a 10-minute half-value temperature of 110° C. to 170° C., and includes the following as examples. (Parenthesized number indicates the decomposition temperature in °C.).

Succinic acid peroxide (110), benzoyl peroxide (110), t-butyl peroxy-2-ethyl hexanoate (113), p-chlorobenzoyl peroxide (115), t-butyl peroxy-isobutylate (115), t-butylperoxyisopropylcarbonate (135), t-butyl peroxy laurate (140), 2,5-dimethyl-2,5-di(benzoylperoxy)hexane (140), t-butyl peroxy acetate (140), di-t-butyl-diperoxyphthalate (140), t-dibutylperoxy maleic acid (140) cyclohexanone peroxide (145), t-butyl peroxy benxoate (145), methyl ethyl ketone peroxide (150), dicumyl peroxide (150), 2,5-dimethyl-2,5-di(t-butyl peroxy)hexane (155), t-butyl cumyl peroxide (155), t-butyl hydroperoxide (158), di-t-butyl peroxide (160), and 2,5-dimethyl 2,5-di(t-butylperoxy)hexyne-3 (170).

The blowing agents used in this invention have a decomposition temperature from 100° C. to 160° C., and the decomposition temperature can be adjusted to this range by the combined use with an accelerator or adjuvant. Examples of such blowing agents are azobisisobutylonitrile, diazocarbonamide (with adjuvant), p-toluenesulfonyl-hydrazide (with adjuvant), and 4,4'-oxybis (benzenesulfonylhydrozide) (with adjuvant).

Examples of the trifunctional monomers used in this invention are triallycyanurate, triallylisocyanurate, and triallyltrimellitate.

The silicone oil used in this invention has a viscosity lower than 100 cSt at room temperature.

The organic peroxide and the blowing agent should be combined so that the following conditions are satisfied:

$$-10° C. \leq \Delta T \leq 50° C. \ (\Delta T = T_p - T_f)$$

where $T_p$ is the decomposition temperature of the organic peroxide for half value in 10 minutes, and $T_f$ is the blowing temperature of the blowing agent. A crosslinking agent and a blowing agent which satisfy the above conditions are added in combination with a trifunctional monomer and silicone oil to an ethylene polymer. When the resulting composition is heated under normal pressure, foaming takes place and simultaneously or a little later corsslinking takes place slowly. When blowing is complete, or immediately before the completion of blowing, the degree of crosslinking increases rapidly, making the open cells (containing some closed cells in some cases) stable. Upon cooling, the cells are fixed.

If $\Delta T$ is greater than $-10°$ C., crosslinking takes place predominantly when the composition is heated, and blowing takes place very little or to such an extent that the resulting cells are closed.

If $\Delta T$ is greater than 50° C., blowing takes place predominantly and resulting cells are instable.

The trifunctional monomer used in this invention increases the crosslinking density very rapidly, and improves the heat resistance and resilience of the resulting foam.

The silicone oil used in this invention helps make cells which are extremely fine and uniform in size.

The ethylene polymer used in this invention has a melt index higher than 1. Ethylene polymers having a melt index lower than 1 will not melt when heated or will cause discoloration and scorching.

The preferable contents of each component for the composition are given below. The organic peroxide is 0.3 to 10 parts by weight based on 100 parts by weight of ethylene polymer. When less than 0.3 parts by weight is used, the composition does not increase in viscosity during foaming, and the foam can collapse even though the trifunctional monomer is added. When more than 10 parts by weight are used, the crosslinking efficiency levels off.

The amount of blowing agent required is generally in an amount of from 1 to 20 parts by weight. When under 1 part by weight is used, the blowing agent does not accomplish effective foaming, and when above 20 parts by weight is used, the blowing agent gives off excessive decomposition product which dissipates wastefully into the atmosphere.

The amount of trifunctional monomer required is an amount of from 0.1 to 10 parts by weight. Under 0.1 part by weight, almost no effect is achieved; and when used about 10 parts by weight, the trifunctional monomer oozes out, giving an adverse effect on the slip property which is important when the foam undergoes fabrication.

The silicone oil or a derivative thereof can be used in an amount from 0.1 to 5 parts by weight. When under 0.1 part by weight are used, the silicone oil has no effect in imparting uniform, fine cell structure; and above 5 parts by weight, the silicone oil oozes out excessively.

The composition of this invention can be incorporated, if required, with an antioxidant, UV stabilizer, inorganic filler, pigment, flame retardant, plasticizer, and other additives and resins and elastomers.

The composition of this invention is heated to a temperature at which both foaming and crosslinking takes place. More particularly, the temperature is between 120° C. and 250° C.

The decomposition temperature of the organic peroxide in this invention is indicated by the temperature at which a pure product decomposes by half for 10 minutes. Therefore, crosslinking in actual process takes place under this temperature.

The heating time in this invention is 1 to 60 minutes in which an open-cell foam is formed.

In the process of this invention, the foam is cooled, after heating, below 50° C. to fix the foam structure.

Heating is accomplished by subjecting the composition to heated gas (air), heated metal (iron or aluminum), infrared rays, burner, electric heater, high frequency, and the like, in the atmosphere or under pressure.

The invention will be further described with reference to examples that follow.

EXAMPLE 1

A foamable composition was prepared by mixing, followed by pelleting, the following components using a Banbury mixer at 70° C. for 5 minutes.

(1) Ethylene-vinyl acetate copolymer (MI=100, VA content=28 wt. %, made by Nippon Unicar Co., Ltd., Japan) . . . 100 parts by weight (2) Azo-bisisobutyronitrile (foaming temperature=100° C.) . . . 5 parts by weight (3) t-Butyl peroxyisopropyl carbonate (decomposition temperature=135° C.) . . . 1 part by weight (4) Triallyl trimellitate . . . 1 part by weight (5) Silicone oil (10 cST, made by Nippon Unicar Co., Ltd., Japan) . . . 1 part by weight The resulting pellets were compression molded into a 1 mm thick sheet at 70° C. and 50 kg/cm$^2$ for 2 minutes. This sheet, held on a 200-mesh wirenetting, was placed for 10 minutes in an oven heated to 130° C. to permit the sheet to expand into a uniform foam. After 10-minute post curing, the foam was removed from the oven and allowed to stand at room temperature. A 3 mm thick soft, open-cell, white foam was obtained. This foam was found to have cell size of 0.2 mm (0.17 to 0.23 mm), apparent secant modulas of 30 kg/cm$^2$, and hardness of 30 measured on a hardness tester (type C). This foam had an apparent density of 165 kg/m$^3$, and picked up 0.65 g of water per 1 cm$^3$ when dipped in water. After outdoor exposure test for 6 months, this foam did not show any sign of degradation such as discoloration and cracking.

EXAMPLE 2

The pellets as prepared in Example 1 were placed in a petri dish in an amount of 7 g. The pellets in the petri dish were heated at 130° C. for 10 minutes in an oven to permit them to expand into uniform foam. After post curing for 15 minutes in the oven, the foam was allowed to stand at room temperature. The resulting foam was 2 cm thick and 7 cm in diameter, similar in properties to that obtained in Example 1.

EXAMPLE 3

The pellets as prepared in Example 1 were placed in a petri dish in an amount of 7 g. The pellets in the petri dish were heated at 90° C. for 5 minutes in an oven, and subsequently heated for 3 minutes by a high-frequency heater (2450 MHz, 1 kW output, made by Nippon Denshi Co., Ltd.) after standing at room temperature, a foam was obtained which was similar to that obtained in Example 2.

EXAMPLE 4

Powder having average particle size of 40 mesh was prepared by crushing ethylene-vinyl acetate copolymer (made by Nippon Unicar Co., Ltd.) having a melt index of 20 and containing 28 wt. % of vinyl acetate. A hundred parts by weight of this powder was compounded with 7 parts of azodicarbonamide (blowing temperature: 135° C.) containing an assistant, 1 part of t-butyl-peroxyisopropyl carbonate (decomposition temperature: 135° C.), 1 part of triallylcyanurate, and 1 part of silicone oil (20 cSt, made by Nippon Unicar Co., Ltd.) using a supermixer for 10 minutes, followed by standing for one day.

This powder composition was placed in a petri dish in an amount of 6 g. The powder in the petri dish was heated at 140° C. for 7 minutes in an oven, followed by standing for 10 minutes. A white, uniform foam, 2 cm thick and 7 cm in diameter, was obtained. It was found that this foam is of open-cell structure having a cell size of 0.2 mm (0.17–0.23 mm) and has resilience of 35 when measured with a hardness tester (type C). The apparent density of this foam was 155 kg/m$^3$.

EXAMPLE 5

A foamable compound was prepared by compounding 100 parts by weight of ethylene-ethyl acrylate copolymer (made by Nippon Unicar Co., Ltd.) having a melt index of 6 and containing 20 wt. % of ethyl acrylate, with 10 parts of azodicarbonamide (blowing temperature: 135° C.) containing an assistant, 1 part of dicumyl peroxide (decomposition temperature: 150° C.), 1 part of triallylcyanurate, and 1 part of silicone oil (20 cSt., made by Nippon Unicar Co., Ltd.) using a Banbury mixer at 90° C. for 5 minutes, followed by pelletization.

The resulting pellets were compression molded into a 1-mm thick sheet at 90° C. and 50 kg/cm$^2$ for 5 minutes. This sheet, held on a 200-mesh wire netting, was placed for 7 minutes in an oven heated to 180° C. to permit the sheet to expand into a uniform foam. After 15-minute post curing, the foam was removed from the oven and allowed to stand at room temperature. A 3 mm thick white open-cell foam was obtained. This foam was found to have cell size at 0.6 mm (0.4 to 0.8 mm), an apparent density of 150 kg/m³, and hardness of 55 measured on a hardness tester (type C). This foam absorbed 0.6 g of water per 1 cm³ of volume when dipped in water.

EXAMPLE 6

A foamable compound was prepared by compounding 100 parts by weight of low-density polyethylene (made by Nippon Unicar Co., Ltd.) having a melt index of 8.0 and a density of 0.918, with 5 parts of azodicarbonamide (blowing temperature: 145° C.) containing an assistant, 1 part of 2,5-dimethyl-2,5-di(t-butyl peroxy)-hexane (decomposition temperature: 155° C.), 1 part of triallyltrimellitate and 1 part of silicone oil (10 cSt, made by Nippon Unicar Co., Ltd.) using a Banbury mixer at 110° C. for 5 minutes, followed by pelletization.

The resulting pellets were compression molded into a 20 mm thick sheet at 120° C. and 100 kg/cm² for 5 minutes. This sheet, held on a 200-mesh wire netting, was placed for 10 minutes in an oven heated to 190° C. to permit the sheet to expand into a uniform foam. After 10 minute post curing, the foam was removed from the oven and allowed to stand at room temperature. A 6 mm thick open-cell foam was obtained. This foam was found to have an average cell size of 0.8 mm (0.4 to 0.8 mm(, an apparent density of 118 kg/m³, and hardness of 70 measured on a hardness tester (type C). This foam absorbed 0.5 g of water per 1 cm³ of volume when dipped in water.

COMPARATIVE EXAMPLE 1

A foamable compound was prepared by compounding 100 parts by weight of low-density polyethylene (made by Nippon Unicar Co., Ltd.) having a melt of 0.3 and a density of 0.929, with 5 parts of azodicarbonamide (blowing temperature: 145° C.) containing an assistant, 1 part of 2,5-dimethyl 2,5-di-(t-butyl peroxy) hexane (decomposition temperature: 155° C.), 1 part of triallyltrimellitate, and 1 part of silicone oil (10 cSt, made by Nippon Unicar Co., Ltd.) using a Banbury mixer at 120° C. for 5 minutes.

The resulting pellets were compression molded into a 1-mm thick sheet at 120° C. and 100 kg/cm² for 5 minutes. This sheet, held on a 200-mesh wire netting, was placed in an oven heated to 230° C. Foaming began when polyethylene was still half melted, and pellet boundries appeared on the sheet. When placed in an oven at 260° C., the sheet became scorched. In the case of a sheet sample which was placed in an oven at 230° C. for 40 minutes, following by cooling, slight foaming was observed, although not uniform.

COMPARATIVE EXAMPLE 2

A compound was prepared by compounding 100 parts by weight of ethylene-vinyl acetate copolymer (made by Nippon Unicar Co., Ltd.) having a melt index of 28 and containing 28 wt. % of vinyl acetate, with 5 parts of azodicarbonamide (blowing temperature: 135° C.) containing an assistant, 1 part of triallylisocyanurate, and 1 part of silicone oil (10 cSt, made by Nippon Unicar Co., Ltd.) using a Banbury mixer at 90° C. for 5 minutes, followed by pelletization.

These pellets were heated in an oven at 160° C., but only a sheet with little foaming was obtained, which had hardness of 80 measured on a hardness tester (type C).

COMPARATIVE EXAMPLE 3

A compound was prepared by compounding 100 parts by weight of ethylene-ethyl acrylate copolymer (made by Nippon Unicar Co., Ltd.) having a melt index of 6 and containing 20 wt. % of ethyl acrylate, with 5 parts of azobisisobutylonitrile (blowing temperature: 100° C.), 1 part of 2,5-di(t-butyl-peroxy)hexane (decomposition temperature: 155° C.), 1 part of triallyltrimellitate, and 1 part of silicone oil (10 cSt, made by Nippon Unicar Co., Ltd.) using a Banbury mixer at 90° C. for 5 minutes, followed by pelletization.

These pellets were placed in a petri dish in an amount of 7 g, and the petri dish was heated in an oven at 180° C. After 3 minutes, foaming took place, but the cells collapsed when the foam was heated for 15 minutes and allowed to cool. The resulting foam was found to have irregular cells from 0.4 to 15 mm in size.

COMPARATIVE EXAMPLE 4

Example 3 was repeated except that triallytrimellitate was not incorporated. The cell size was broadly distributed from 0.32 to 0.68 mm, and a large void about 15 mm in diameter was found at the center of the specimen.

COMPARATIVE EXAMPLE 5

Example 3 was repeated except that silicone oil was not incorporated. The cell size was broadly distributed from 0.24 to 0.62 mm, and the water absorption was 0.28 g per 1 cm³ of volume due to the presence of a large number of closed cells.

What is claimed is:

1. A process for producing open-cell cross linked polyolefin foam which comprises forming a composition comprising 100 parts by weight of olefin resin, 1 to 20 parts by weight of blowing agent, 0.3 to 10 parts by weight of organic peroxide crosslinking agent, 0.1 to 10 parts by weight of trifunctional monomer, and 1 to 5 parts by weight of silicone oil or a derivative thereof having a viscosity lower than 10 cSt at room temperature, said organic peroxide having a 10-minute half-value temperature ($T_p$) of 110° C. to 170° C. and said blowing agent having a decomposition temperature ($T_f$) of 100° C. to 160° C., $T_p$ and $T_f$ satisfying the following equation:

$$-10° C. \leq T_p - T_f \leq 50° C.$$

molding said composition into pellets, powder, film or sheets, and subsequently heating said moldings in a single step.

* * * * *